US006927560B2

(12) United States Patent
Pedigo et al.

(10) Patent No.: US 6,927,560 B2
(45) Date of Patent: Aug. 9, 2005

(54) CONTROL SYSTEM AND METHOD FOR A MAGNETIC INDEXER FOR HIGH ACCURACY HOLE DRILLING

(75) Inventors: Samuel F. Pedigo, Seattle, WA (US); Gary E. Georgeson, Federal Way, WA (US); Raymond D. Rempt, Woddinville, WA (US); Gregory L. Clark, Issaquah, WA (US); Joseph L. Hafenrichter, Bellevue, WA (US)

(73) Assignee: The Boeing Company, Chicago, IL (US)

(*) Notice: Subject to any disclaimer, the term of this patent is extended or adjusted under 35 U.S.C. 154(b) by 82 days.

(21) Appl. No.: 10/448,560

(22) Filed: May 30, 2003

(65) Prior Publication Data

US 2003/0210027 A1 Nov. 13, 2003

Related U.S. Application Data

(63) Continuation-in-part of application No. 10/143,242, filed on May 9, 2002.

(51) Int. Cl.$^7$ ........................... G01R 33/02; G01B 7/00
(52) U.S. Cl. ..................... 324/67; 324/207.17; 324/260
(58) Field of Search ............................ 324/67, 207.17, 324/207.26, 260, 326

(56) References Cited

U.S. PATENT DOCUMENTS

| | | |
|---|---|---|
| 1,971,189 A | 8/1934 | Leibing |
| 2,346,773 A | 4/1944 | McBride et al. |
| 2,600,857 A | 6/1952 | De La Mater |
| 2,807,780 A | 9/1957 | Ludwig et al. |
| 2,844,977 A | 7/1958 | Morse |
| 3,836,848 A * | 9/1974 | Blevins ........................ 324/67 |
| 4,388,890 A | 6/1983 | Wester et al. |
| 5,172,055 A | 12/1992 | Horn |
| 5,432,434 A | 7/1995 | Tugwell |
| 5,434,500 A | 7/1995 | Hauck et al. |
| 5,445,000 A | 8/1995 | Brown et al. |
| 5,465,500 A | 11/1995 | Nammoto |
| 6,087,824 A | 7/2000 | Shiao |
| 2002/0050043 A1 | 5/2002 | Sarh et al. |

FOREIGN PATENT DOCUMENTS

| | | |
|---|---|---|
| DE | 508347 | 9/1930 |
| GB | 2 363 432 A | 6/2000 |

OTHER PUBLICATIONS

U.S. Appl. No. 10/143,242, filed May 9, 2002, Georgeson et al.
Honeywell Sensor Products, Three–Axis Magnetic Sensor Hybrid, Oct. 1997.
International Search Report for PCT/US 03/13213 mailed Jul. 18, 2003.

* cited by examiner

*Primary Examiner*—Edward Lefkowitz
*Assistant Examiner*—Reena Aurora
(74) *Attorney, Agent, or Firm*—Harness Dickey & Pierce P.L.C.

(57) ABSTRACT

A method for locating a device producing a magnetic field in a blind or inaccessible position of a work piece. A magnet is initially placed on a first side of the work piece such that a magnetic field produced by the magnet extends through the work piece. Probes are then positioned over a second surface of the work piece to determine the location of the axis of the magnet via the strength of the sensed magnetic field and the location where the strength measurements are made. Once the position of the axis of the magnet is determined, the work surface is either marked or worked on through the platform on which the probes are positioned. In particular, the present invention allows a very accurate positioning of a work tool on the second surface without the need to first visualize the first surface of the work piece.

20 Claims, 5 Drawing Sheets

CONTROL SYSTEM AND METHOD FOR A MAGNETIC INDEXER FOR HIGH ACCURACY HOLE DRILLING

RELATED U.S. PATENT INFORMATION

This application is a continuation in part of U.S. application Ser. No. 10/143,242 filed May 9, 2002, presently pending. The disclosure of which is incorporated herein by reference.

FIELD OF THE INVENTION

The present invention relates to a system to precisely form holes, and more particularly to a system to locate a device and indicate a location to form a hole.

BACKGROUND OF THE INVENTION

It is often desirable to locate, with a high degree of accuracy and specificity, locations in a blind area of a working surface. In particular, if it is desired to affix together two portions of a structure, where only an outside surface is visible to a work person, it is often difficult, if not impossible, to precisely and reproducibly place a fastener between the two portions. This is particularly relevant in regards to aircraft where the skin of the aircraft is placed over an internal frame structure and must be affixed thereto. Once the skin is in place, it is often very difficult to properly locate a fastener that must first go through the skin to be affixed to the internal structure of the aircraft. This situation arises in other construction and manufacturing instances as well.

One solution has been the attempt to back drill from inside the structure. That is, to have a work person physically place themselves inside the structure and then cut through the sub-structure through the skin. This, however, often creates impreciseness in the hole creation. For example, the full sized hole which is formed normal to the skin of the air craft, which is following the back drilled pilot hole, may be angular. That is because the hole formed from the inside of the skin can not be easily formed exactly normal to the skin of the aircraft. In particular the internal structures of the part may not be normal to the skin while the hole on through the outside of the skin must be normal to the skin. Furthermore, it is very hard on the work person who must crawl into the usually small areas to produce the holes.

Backmarkers are widely used in the aircraft industry to transfer holes from the understructure to the outside surface. Backmarkers consist of a long split piece of thin metal with a pin on one side and a hole on the other that are in alignment. The pin side is slipped under the skin to line up with a pilot hole, in the understructure, and a pilot hole is drilled into the outer skin. This method does not work on wide parts and thick parts. Deflection of the split plates and the difficulty of installing the device on thick parts limits the use to thin sheet metal areas near the edge of the skin.

Another method is to use a probe or locating device to determine a precise position on the skin. In particular, the device is first programmed with locations in three dimensional space. Therefore, when a surface is placed within reach of the probe, the probe can determine the location of a point which the probe touches. This, however, requires an extensive pre-programming and precise placement of the surface which is to be probed. Using such special orientation probes increases time and manufacturing costs for many applications. Also, probing the understructure before drilling has several shortcomings. When a skin is placed over a built up structure, the weight of the skin causes the structure and tooling to deform. It is possible that probed holes will move between measurements and drilling. Also, temperature changes between probing and drilling can cause the holes to not align due to growth or shrinkage to the part and differences in growth between the upper and lower surfaces. Fastener induced growth and coldworking of holes in aircraft structure can also shift positions of the holes between probing and drilling.

In aircraft construction, it is often critical to produce a hole, for fastening a portion of the airframe to another portion, having a dimensional tolerance to within hundredths of an inch. One specific method of construction for internal airframe structure involves the use of sine wave topography on the internal structures or beams of the aircraft. To ensure a sufficiently strong connection, which will withstand the extreme stresses that an aircraft will encounter, the fastener must be placed at a peak of the sine wave. Therefore, placement of a fastener must be extremely precise to ensure that a peak is hit, rather than a valley or a portion adjacent to the peak. It is also desirable to precisely locate edges of hidden structure pieces. In this and many other applications, the precise locating of the fastener becomes critically important.

SUMMARY OF THE INVENTION

The present invention is directed to a control system for a magnetic indexer which locates a device that is producing a magnetic field in a blind or inaccessible position. A magnet is initially placed on one side of the work surface such that a magnetic field produced by the magnet extends through the work surface such that the axis of the magnetic field is substantially perpendicular to the work surface. The device, comprising a plurality of probes which are affected by magnetic fields, is positioned over the opposite side of the work surface. The probes are then positioned over the work surface to determine the location of the magnet. Once the position of the magnetic field axis is determined, the work surface is either marked or worked on through the platform on which the probes are positioned. In particular, a hole may be reproducibly placed directly over the magnet even when the underside of the work piece is not visible. Additionally, with the present invention, a work tool may be very accurately positioned on the work surface without seeing the underside of the work surface.

The present provides a new method of precisely locating a position. A precisely pre-positioned device that produces a field is placed on a first side of a surface. Information is gathered regarding the strength of the field in several locations on a second side of the surface. Information is also gathered regarding where those locations were made. From the information the location of the center axis of the field is then determined. Once the location of the center axis of the field is determined then work may be performed at a precise and predetermined location.

A second embodiment of the present invention includes a control circuit for determining a location of a device that produces a field having varying strengths depending upon a lateral distance from the device. The control circuit accepts information regarding the strength of the field and the locations where the strength of the field was sensed. From that information, the circuit determines the location of the device.

A third embodiment of the present invention includes a control circuit to determine a location of a precisely pre-positioned, magnetic device through a surface. The control circuit accepts information regarding the strength of the magnetic field on the surface and the locations where the strength of the field was sensed. From that information, the circuit determines the location of the device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
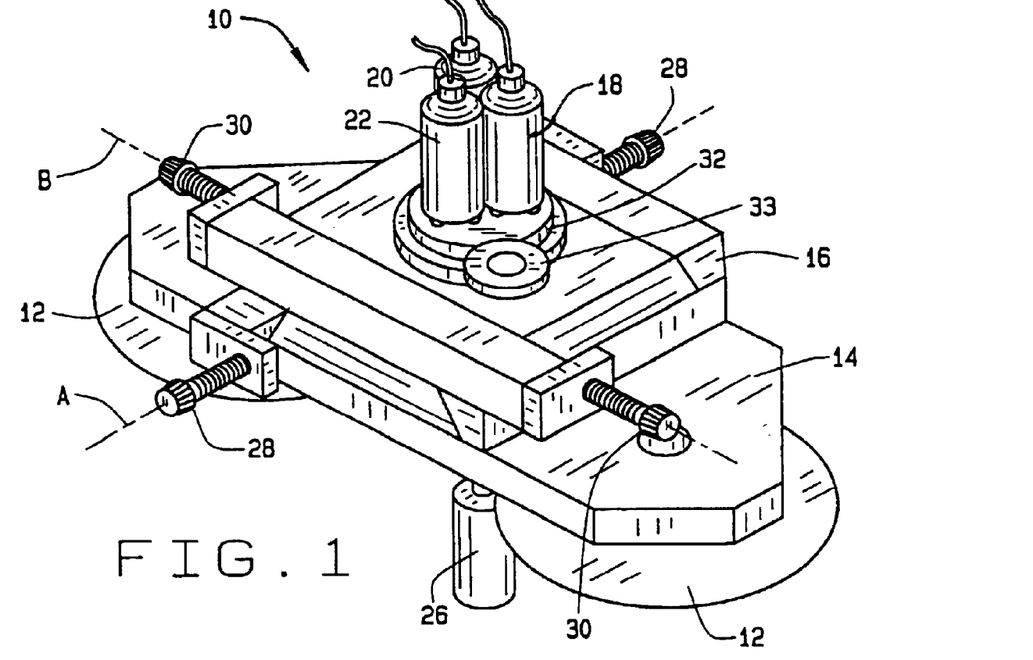
FIG. 1 is a perspective view of a digital magnetizer in accordance with a preferred embodiment of the present invention.
Figure 2:
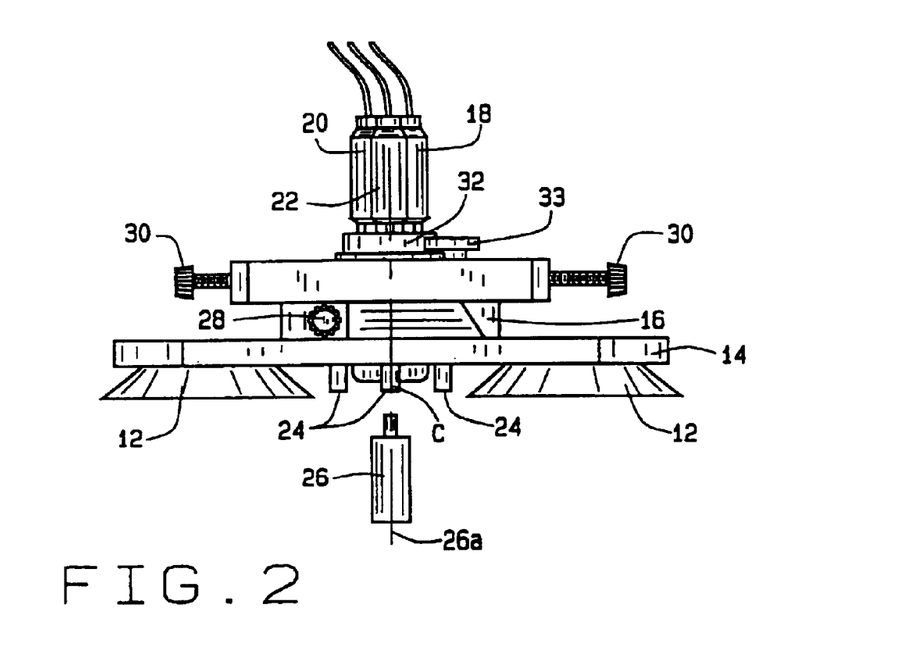
FIG. 2 is a side elevational view of the magnetic indexer of FIG. 1.

With reference to FIGS. 1 and 2, a magnetic indexer 10 in accordance with a preferred embodiment of the present invention is shown. The magnetic indexer 10 includes a vacuum attachment member 12, a work piece platform 14, a probe platform 16 and a plurality of probes 18, 20, and 22. The vacuum attachment member 12 generally includes members in which a vacuum may be created, so as to affix the work piece platform 14 to a work piece (described further herein). It will be understood, however, that any appropriate system suitable for attaching the work piece platform 14 to a work piece may be used.

Extending generally perpendicular from the work piece platform 14 are stabilizing members 24 (FIG. 2) which engage the work piece to ensure that the work piece platform 14 is substantially parallel to the work piece. A magnet 26 is positioned on an opposite side of the work piece 36 from the work piece platform 14. The magnet 26 produces a magnetic field which has a central magnetic axis 26a. Extending from the work piece platform 14 is the probe platform 16. The probe platform 16 may be moveable relative to the work piece platform 14. A first set of adjustment screws 28 allow for movement of the probe platform 16 in a first axis A. A second set of adjustment screws 30 allow for adjustment of the probe platform 16 along a second axis B. Therefore the probe platform 16 may be moved, relative to the work piece platform 14, using the first set of adjustment screws 28 and the second set of adjustment screws 30, in two dimensions.

Affixed to the probe platform 16 are the probes 18, 20, and 22. In one embodiment, the probes 18, 20, and 22 are spaced apart so that the probes define a center axis C. The center axis C may be an axis equidistant from, but parallel to, an axis along which each of the probes 18, 20, and 22 extend. Probe platform 16, though, may be constructed in which the probes 18, 20, and 22 are neither equidistant nor parallel to the center axis C. For instance, the probes 18, 20, and 22 may be canted at angle from the center axis C. Where the probes are either not equidistant or not parallel (e.g. because of inaccuracy introduced during the manufacture of the probe platform 16), adjustments may be made by the processor 34 to account for these configurations.

The probes 18, 20, and 22 are affixed to a secondary probe platform 32 which is affixed to the probe platform 16 with a fastener 33. This allows the secondary probe platform 32 to be removed from the probe platform 16 without moving the work piece platform 14.

Figure 3:
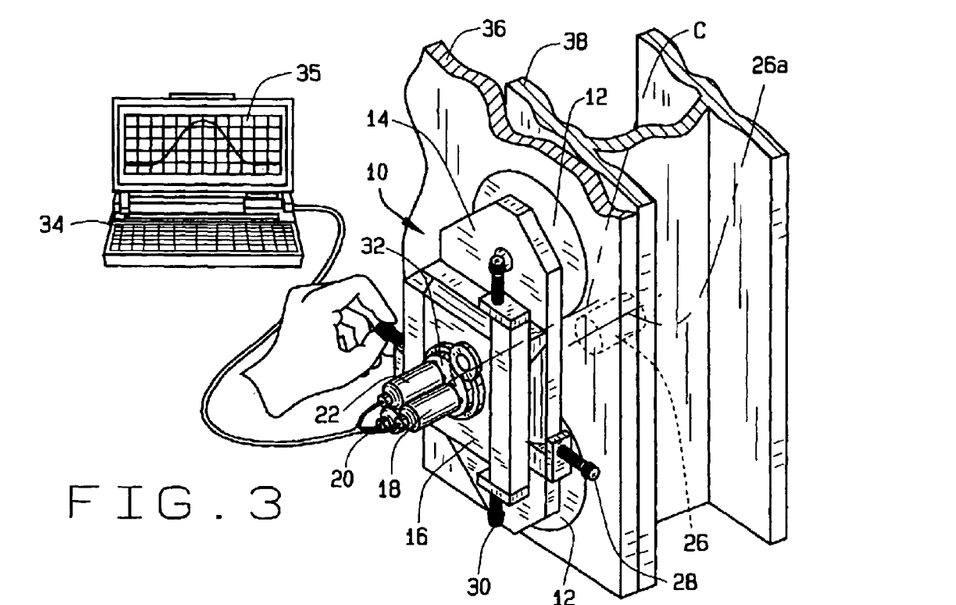
FIG. 3 is a perspective view of the magnetic indexer in use.
Figure 4:
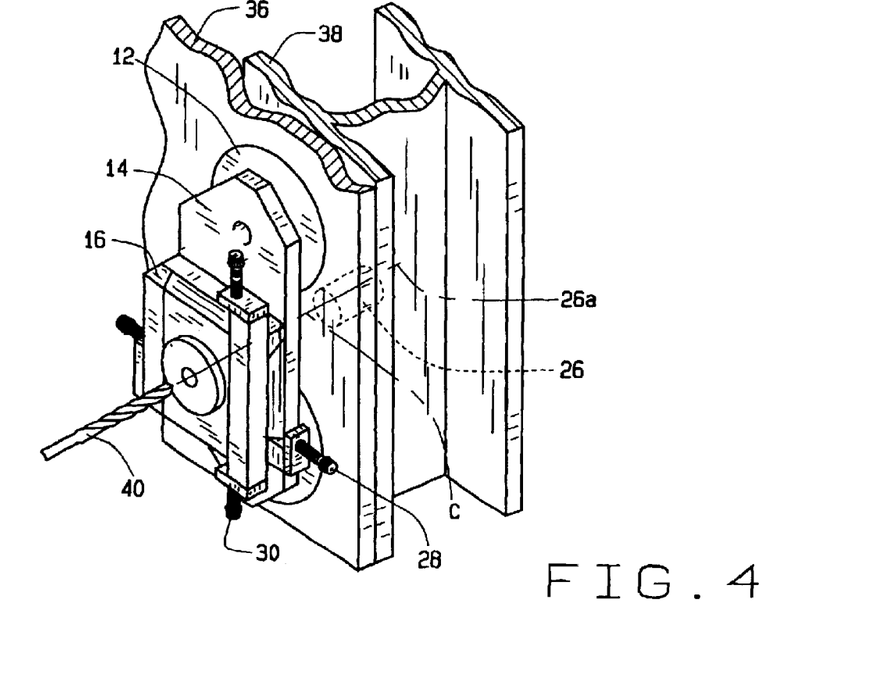
FIG. 4 is a perspective view of the platform of the magnetic indexer after it has been positioned.

With reference to FIGS. 3 and 4, the effect of each probe 18, 20, and 22 is determined by a processor 34. The processor 34 may be any appropriate processor, however, a microprocessor is able to determine the effect of the magnetic field on each of the probes 18, 20, 22 and to determine the relative orientation of each of the probes 18, 20, and 22 to the magnetic field. Where the probes 18, 20, and 22 are either not equidistant to, or are not parallel with, the center axis C, the processor 34 may also make the necessary adjustments to account for these configurations, thereby calibrating the probe platform 16. An embodiment of the present invention, adapted for the demands of aircraft manufacturing, includes a processor 34 to make these adjustments.

The processor's 34 determination is displayed on a display device 35. In particular, a CRT or LCD screen may be used as the display device 35. Another embodiment employs two perpendicular rows of lights (or LEDs) to give a representation of distance to the center of the magnet 26a with respect to an x and y axis of the work piece. The processor 34 can display on the display device 35 a confirmation that the center axis C is co-linear with the magnetic axis 26a.

The magnetic indexer 10 is affixed to a surface or work piece 36 with the vacuum attachment members 12. As discussed above, the vacuum attachment members 12 may affix the work piece platform 14 to the work piece 36 through any appropriate means. For example, a vacuum may be created within the vacuum attachment members 12 allowing the work piece platform 14 to be held in place. It will also be understood that more than two vacuum attachment members 12 may be used depending upon the size of the work piece platform 14.

Below the work piece 36 is a sub-structure or support beam 38. At the position where a hole must be produced, a magnet 26 has been placed. The magnet 26 is placed on the beam 38 in a preliminary manufacturing step before the work piece platform 14 is secured to the work piece 36. Because of this, the magnet 26 is able to be easily placed in the exact position where a hole must be produced for an attachment between the work piece 36 and the beam 38. The magnetic indexer 10 is placed over a position relatively close to where the hole must be produced. Then, using the adjustment screws 28, 30, the probe platform 16 is adjusted until the center axis C is approximately co-linear with the magnetic axis 26a.

It will be understood that the magnetic indexer 10 does not have to be moved until the center axis C is directly over the magnet. As long as the magnet 26 is inside a perimeter formed by the arrangement of the probes 18, 20, and 22, the present invention achieves a unique solution for the location of the magnet 26 without necessarily moving the magnetic indexer 10. By eliminating the necessity of moving the probes 18, 20, and 22 the present invention simplifies the process of locating the hole and eliminates the inaccuracies associated with relying on the maximum magnetic field strength. Accordingly, the present invention is more accurate and less prone to error.

Once the magnet 26 is located, the secondary probe platform 32 is removed so that a drill bit 40 can be inserted through the probe platform 16 and work piece platform 14 to produce a hole in the work piece 36. It will be understood that additional drill guide members may be put in place of the secondary probe platform 32 to increase the precision of the drilling step performed by the drill bit 40 as it proceeds through the magnetic indexer 10.

Once the hole is produced through the work piece 36 and the beam 38, the magnet 26 is removed during a clean up process of the internal area. Furthermore, the magnetic indexer 10 is then removed from the work piece 36 by pressurizing the vacuum attachment members 12 to remove the magnetic indexer 10 from the work piece 36. Then, any appropriate fastener is used to affix the work piece 36 permanently to the beam 38.

The exact location of the magnet 26 is determined by locating the magnetic axis 26a, which is a north-south (N-S) pole axis of the magnet 26. The magnetic axis 26a, also termed the center or field axis, of the magnet 26 is the center of the magnetic field and the area where the magnetic field is the strongest. The magnet 26 is placed on the beam 38 so that the magnetic axis 26a is substantially perpendicular to the surface of the beam 38. Therefore, once the work piece 36 is affixed to the beam 38, the magnetic axis 26a is also perpendicular to the surface of the work piece 36. Additionally, the work piece 36 should not interfere with the magnetic field produced by the magnet 26. It will be understood, however, that as long as the magnetic field of the magnet 26 is powerful enough for the probes 18, 20, 22 to sense the field produced by the magnet 26, the work piece 36 may be formed of virtually any non-magnetic material.

It will be understood that a reference to a single probe 18 in the following description is exemplary of each of the probes 18, 20, and 22 and its description as a single probe is merely for clarity. The probe 18 is affected by, that is the probe 18 senses, the magnetic field produced by the magnet 26. One exemplary probe type is a Hall-Effect probe. In the Hall-Effect probe 18, the magnetic field produced by the magnet 26 creates a voltage when a current is running perpendicular to the field in the Hall-Effect probe 18. The Hall-Effect probe 18 measures the induced voltage produced due to the magnetic field of the magnet 26. Knowing the induced voltage, and the current, the strength of the magnetic field is determined using the equation $V_H ned/I=B$. According to the equation, $V_H$ is equal to the Hall-voltage, n is equal to the charge carrier density, e is equal to the electronic charge, d is equal to the strip width, and I is equal to the current. This equation results in B, which is the strength of the magnetic field. Once the strength of the magnetic field is known by use of the Hall-Effect probe 18, the location of the magnetic axis 26a may be determined. The closer the Hall-Effect probe 18 is to the magnetic axis 26a, the greater the response in the Hall-Effect probe 18.

The processor 34 determines and processes the affect produced on each of the probes 18, 20, and 22. The display device 35 displays the affect determined by the processor 34. The processor 34 may also indicate which way the probe platform 16 may be moved, using the adjustment screws 28, 30, to correctly position the center axis C over the magnetic axis 26a if such a move is desired. Then, once each of the probes 18, 20, and 22 indicates an equivalent response, it is known that the center axis C is positioned directly over the magnetic axis 26a. At this point, the display indicates that the center axis C is over the magnetic axis 26a and that the operator should make no further adjustments, if the operator has chosen to move the probe platform 16. In particular, the center axis C will be co-linear with the magnetic axis 26aof the magnet 26. Once it is displayed that the center axis C is over the magnetic axis 26a, the secondary probe platform 32 is removed so that the drill point or bit 40 may be introduced to produce the desired hole in the beam 38.

Figure 5:
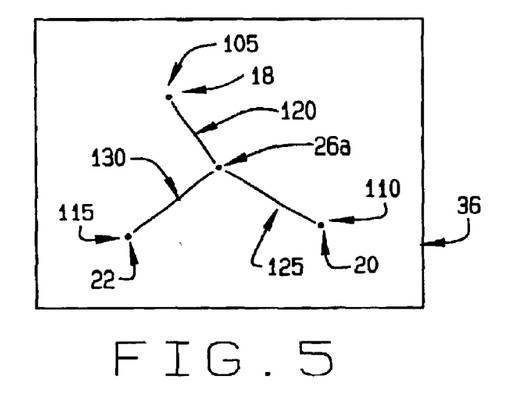
FIG. 5 is a simplified top view of a work piece to be machined per the present invention.

Turning now to FIG. 5, a simplified schematic of work piece 36 and probes 18, 20, and 22 will aid in understanding how the processor 34 processes the affect produced on each probe to determine the location of the magnetic axis 26a without requiring movement of the probe platform 16 as previously described. The present invention employs the relationship between the magnetic field strength and distance from the center of the magnetic field to determine the location of the magnetic axis 26a. Since the maximum strength of the magnetic field associated with magnet 26 is known, or can readily be sensed, sensing the magnetic field at locations near the magnet 26 will yield the distance from each location to the magnetic axis 26a. By then calculating the equations for circles around each location, of a radius corresponding to that location's distance from the magnetic axis 26a, one can determine where the circles intersect. Since the magnetic axis 26a exists on each circle, the intersection of the circles precisely locates the magnetic axis 26a. Effectively, the solution of the simultaneous circle equations yields the location of the magnetic axis 26a.

More particularly, FIG. 5 shows a top view of the work piece 36 with three locations 105, 110, and 115 where the strength of the magnetic field may be sensed. The locations 105, 110 and 115 correspond to the positions of probes 18, 20, and 22 on the work piece 36. The magnetic axis 26a can be seen as a point on the surface of work piece 36.

Figure 9:
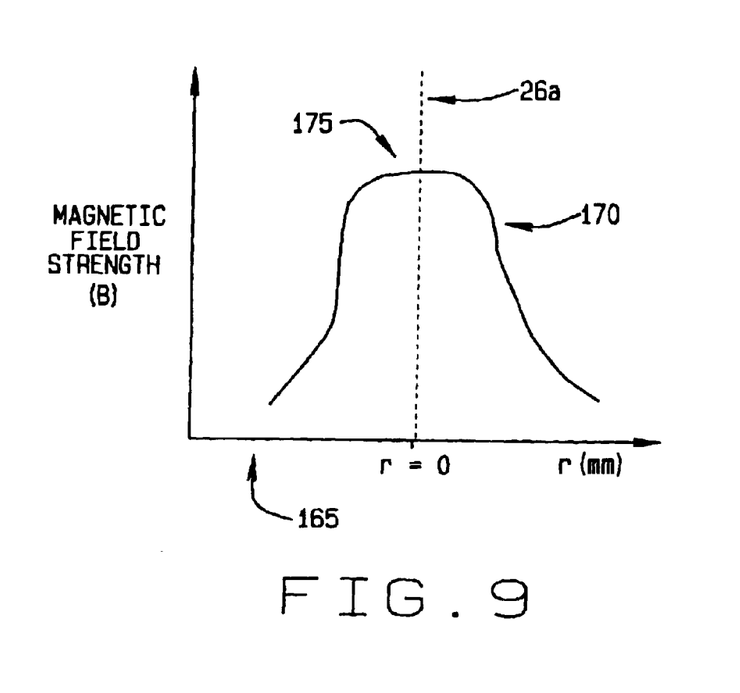
FIG. 9 is a graph of the magnetic field strength along the surface of the work piece.

While magnetic axis 26a has been represented by a point in FIG. 5, a graph 165 of the magnetic field strength around the magnetic axis 26a reveals a plateau 175 surrounding magnetic axis 26a, as can be seen in FIG. 9. For methods of determining the location of the magnetic axis 26a that rely alone upon sensing the peak magnetic field strength relatively near the location of the magnetic axis 26a, the plateau 175 introduces a source of inaccuracy. In areas subject to the plateau 175, even relatively large changes in the position of the probes 18, 20, and 22 result in relatively small changes in the sensed strength of the magnetic field. Hence, these methods suffer from the disadvantage of poor resolution in determining the location of the magnetic axis 26a. In contrast, the precision of determining the location of the magnetic axis 26a and placing the drill bit 40 may be improved as follows.

Theoretically, the strength of a magnetic field, B, on a plane perpendicular to its magnetic axis varies inversely with the cube of the distance, r, from the central axis of the magnetic field. Thus, knowing the strength of a magnetic field at the magnetic axis allows calculation of the distance r between the location where the strength is known and the magnetic axis. In practice the flat, pancake magnets (or in the alternative tall cylindrical magnets) beneficially employed by the present invention have a field strength drop-off with lateral distance that is not a simple cube function. The actual relation includes a consideration of the shape of the particular magnet employed. Thus, the drop-off in field strength with distance for each particular magnet should be characterized (i.e. the relationship between lateral distance and field strength should be determined empirically) prior to calculating the circle equations.

Accordingly, after the relationship between lateral distance and field strength has been characterized, the processor 34 may proceed with calculating the circle equations. Then, by sensing the magnetic field strength at first location 105, the processor 34 may compute the first distance 120 between the probe 18 and the magnetic axis 26a. Likewise, by sensing the magnetic field strength at second and third locations 110 and 115 the processor 34 may calculate the second and third distances 125 and 130 respectively between the magnetic axis 26 and the probes 20 and 22, respectively.

Figure 6:
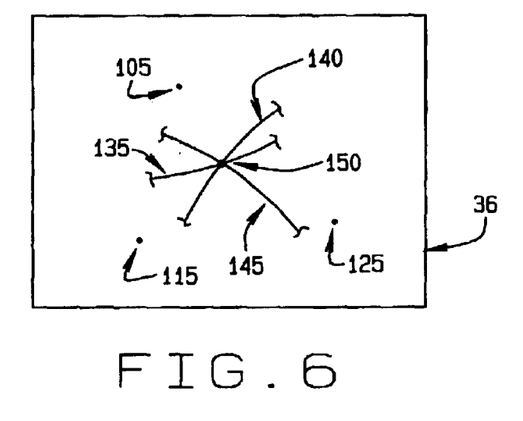
FIG. 6 is a top view of the work piece of FIG. 5 showing the geometry employed by the current invention in extrapolating the center of the axis of the magnetic device.

Continuing with locating the magnetic axis 26a, the processor computes the equations for the three circles 135, 140, and 145 (shown greatly exaggerated in comparison to the size of the work piece 36 in FIG. 6). For circle 135, the processor bases the equation on the location 105 of the first probe 18 and the first distance 120 as previously calculated. Likewise, the processor bases the equations for circles 140 and 145 on second and third locations 110 and 115 and on second and third distances 125 and 130, respectively. Since the three probes 18, 20, and 22 each sense the magnetic field about magnetic axis 26a, the magnetic axis 26a will lie on the intersection 150 of the three circles 135, 140, and 145 when the distances 120, 125, and 130 are the same. Accordingly, the processor computes the point at which the three circles 135, 140, and 145 intersect to determine the location of magnetic axis 26a on a plane defined by the locations of the three probes 18, 20, and 22. In the previous discussion, it has been assumed that the plane is an x-y plane.

However, the processor 34 may also determine the location of the tip of the magnet 26 in all three dimensions: x, y and z. To do so, reference is made to the inverse variation of the magnetic field strength with vertical distance from the tip of the magnet 26. More particularly, each of the probes 18, 20, and 22 is located at an (x, y) point which defines a line perpendicular to the x-y plane. Along that line the magnetic field strength varies inversely with the height (z) of a probe above the tip of the magnet 26.

Accordingly, the processor 34 characterizes the relationship between the field strength and the vertical distance from the tip of the magnet 26 to the location of each probe 18, 20, and 22. Then the probe platform 16 is positioned near the magnetic axis 26a over the work piece. At this time, the processor 34 may sense the field strengths via probes 18, 20, and 22. The processor 34 then solves the three resulting simultaneous equations to accurately determine the vertical location of the tip of the magnet 26. Thus, the processor 34 may locate the tip of the magnet 26 despite variations in the height of the outside surface of the work piece 36 or variations in the height of the probes 18, 20, and 22. By combining the determination of the lateral (i.e. x-y) and vertical locations, the processor may determine the location of the tip of the magnet 26 in all three dimensions (x, y, and z).

The ability to locate the tip of the magnet 26 in all three dimensions further enables the processor 34 to control work on the work piece 36. For instance, the processor 34 may command a robot 406 (FIG. 10) holding a work tool (not shown) to center the work tool over the x-y location of the magnetic axis 26a (but on the side of the work piece 36 opposite that of the magnet 26). The processor 34 may then command the robot 406 to bring the work tool into close vertical proximity to the work piece 36. Then the processor 34 may command the robot 406 to begin creating the hole for a fastener. Using the vertical location of the tip of the magnet 26, the processor 34 may then command the robot 406 to advance the work tool down through the work piece 36, stopping the work tool when the work tool has advanced to within a predetermined vertical offset from the location of the tip.

Figure 10:
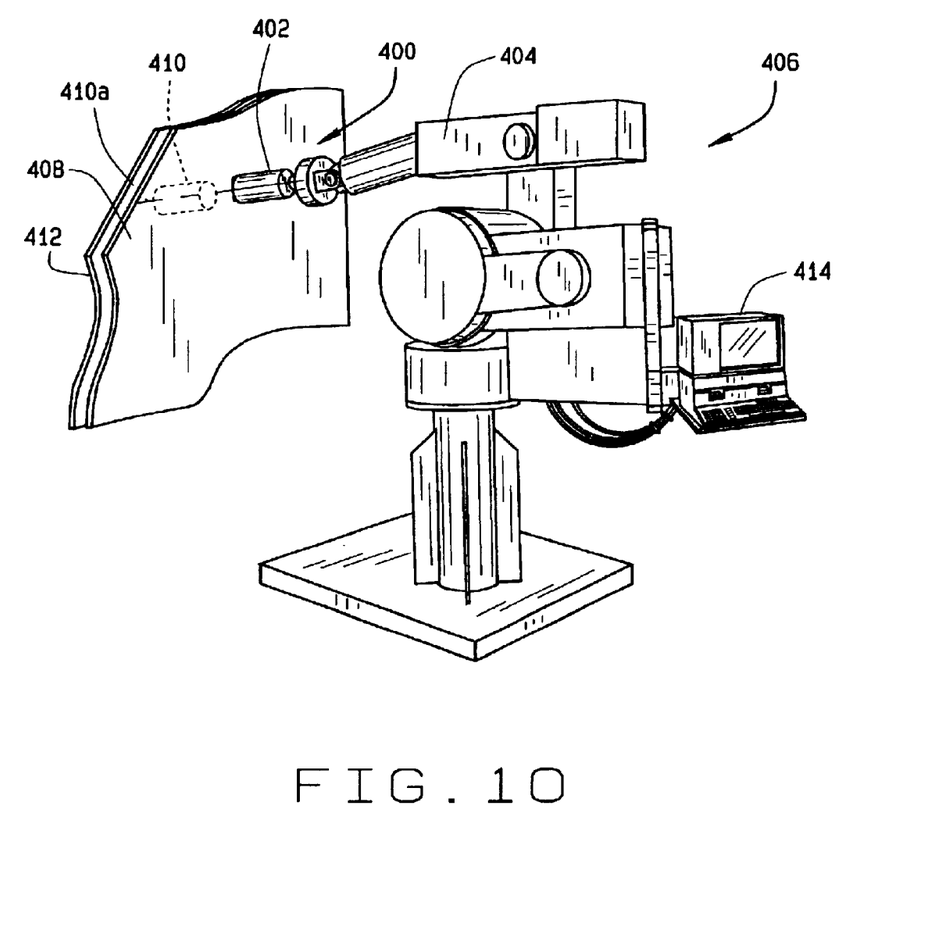
FIG. 10 is a perspective view of an alternative preferred embodiment of the magnetic indexer.

Thus not only may the processor 34 command the robot 406 to create a hole through the work piece 36, but locating the tip of the magnet 26 vertically also enables the processor 34 to stop the work tool before the work tool intrudes much beyond the work piece 36. Accordingly, burring of the interior surface of the work piece 36 is minimized. Moreover, chips from the operation are more prone to be retained by the work tool and withdrawn with the work tool. Accordingly, foreign objects (the chips) within the fuselage may be minimized thereby eliminating clean up work and making for a quieter, rattle free, airframe. Additionally, stopping the work tool before it protrudes much from the work piece 36 avoids damaging interior components with the work tool when those components may be in close proximity to the work location.

In another embodiment of the invention the probes 18, 20, and 22 are positioned so that one or more of them are in the area where the rate of change in the magnetic field per unit of distance is greatest (i.e. the rate of change or derivative of magnetic field strength with respect to distance from the magnetic axis dB/dr reaches a maximum). Because the strength of the magnetic field changes rapidly in the area of the maximum rate of change 170 (FIG. 9), a small movement of the probe(s) in that area produces a relatively large change in the sensed magnetic field strength.

Likewise, when the probe platform 16 remains in one place, small variations in the distance between the probes 18, 20, and 22 and the magnetic axis 26a result in large differences in the diameters of the circles. Favorable results are generally achieved when the probes 18, 20, and 22 are placed approximately four times the diameter of the magnet 26 from the center of the magnet 26a and left in those locations during the determination process. Thus, the present embodiment improves the resolution of processor 34 in precisely determining the location of the magnetic axis 26a.

Yet another preferred embodiment includes a circuit 205 for determining the location of the magnetic axis 26a, as shown in block diagram form in FIG. 9. The circuit 205 may be hard wired, programmed into a computer, programmed into a CNC machine, or programmed into another digital device (not shown). Instructions for the programmable embodiment of circuit 205 may be stored on any machine readable medium such as, by way of example, electronic circuits, ROMs, CD, EPROM, hard disks, floppy disk, RF link, the internet (for downloading the instructions) or internal networks.

Figure 8:
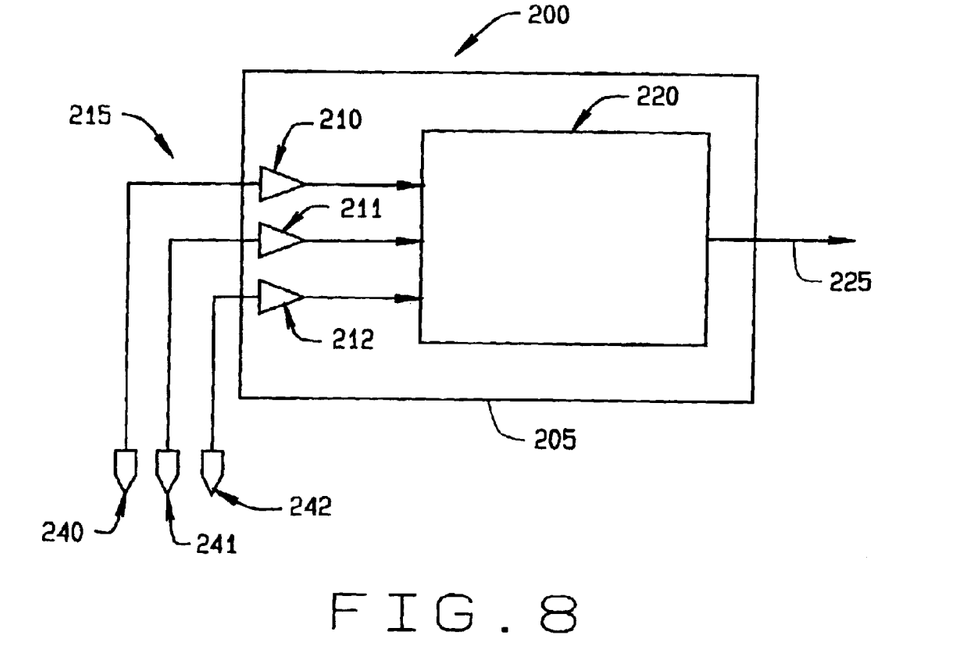
FIG. 8 is a block diagram of a circuit according to the present invention.

The input 215 to the circuit 205 accepts probe location and magnetic field strength signals from the magnetic indexer 10 and the probes 18, 20, and 22. From that information the circuit determines the location of magnetic axis 26a. Outputs from the circuit include a magnetic axis location output 225 and a confirmation that the center axis C of the probes 240, 241, and 242 is co-linear with the magnetic axis 26a. The probes 240, 241, and 242, the circuit 205, and the outputs therefore constitute a system 200 for determining the location of the magnetic axis 26a. It will be appreciated by those skilled in the art that probes 240, 241 and 242 may be identical in construction and operation to probes 18, 20, and 22.

Circuit 205 operates by accepting the location and magnetic field strength signals from the magnetic indexer 10 and the probes 18, 20, and 22. One or more amplifiers 210, 211, and 212 condition and amplify the raw signals as needed. The amplifiers 210, 211, and 212 output information regarding the magnetic field strengths and locations of the probes 240, 241, and 242 to a magnetic axis location determination circuit 220. The location circuit 220 uses the magnetic field strength and location information from the probes 18, 20, and 22 to determine the location of the magnetic axis 26a via the equations discussed previously. Circuit 205 also makes the location of the magnetic axis 26a available at the output 225. In turn, the output 225 may be connected to a device to position a tool, such as a CNC machine, at the location of the magnetic axis 26a.

Figure 7:
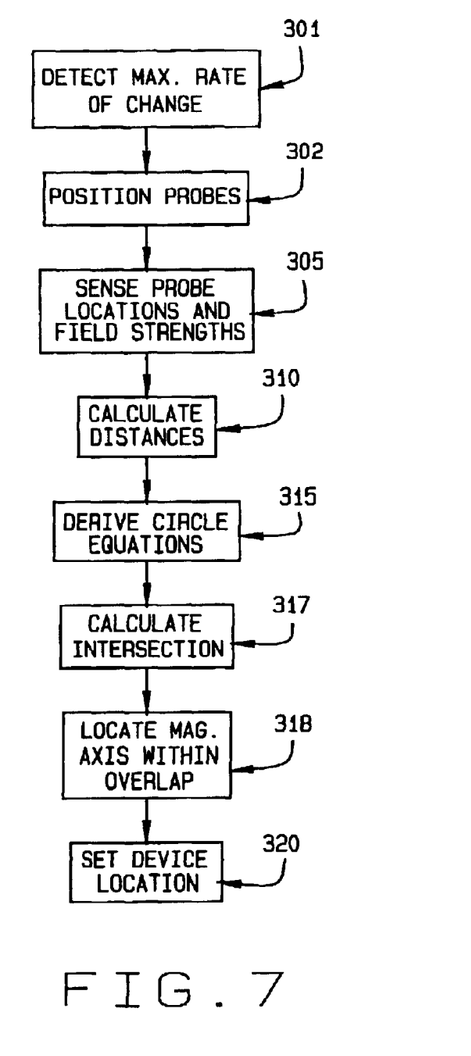
FIG. 7 is a flow chart of a method according to the present invention.

Another embodiment includes a method of determining the location of the magnetic axis 26a as illustrated in FIG. 7. First the probes 18, 20, and 22 may be used to detect where on the work piece 36 the derivative of the magnetic field strength reaches a maximum, as in step 301. One or more of the probes 18, 20, and 22 are then positioned in that area in step 302. While positioning of the probes 18, 20, and 22 in that area provides greater precision in locating the magnetic axis 26a, doing so is not necessary for success. After the probes 18, 20, and 22 are positioned near the magnetic axis 26a, the probes 18, 20, and 22 sense the strength of the magnetic field at locations 105, 110, and 115 (FIG. 5). The locations 105, 110, and 115 of the probes 18, 20, and 22 are also sensed. These location and field strength measurements are shown in step 305.

Next, the distances 120, 125, and 130 (FIG. 5) are calculated in step 310 using the sensed magnetic field strengths and the corresponding locations 105, 110, and 115. From the distances 120, 125, and 130 and the locations 105, 110, and 115, the equations for circles 135, 140, and 145 are derived in step 315. Then the intersection point 150 of the circles 135, 140, and 145 is calculated in step 317. If the circles do indeed intersect at one point 150, then the location of the center of the magnetic field 26a is set equal to the intersection point 150.

However, variations in the height of each probe above the work surface (or the tip of the magnet) may result in the circles either overlapping or not contacting at all. In such cases, analytical or graphical techniques may be employed to locate the magnetic axis 26a within the overlap(s) or gap(s) between the circles. See step 318. For instance, for each pair of circles which overlap the two points of intersection are used to compute the equation of a line. Thus for three probes, three lines (not shown) may result. The intersection of these lines may then be computed to locate the center of the magnetic field 26a with great accuracy.

It is also possible for one or more pairs of the circles to not make contact with one another at all. Where a pair of circles does not make contact, then the processor 34 calculates the equation of a line defined by being perpendicular to a line connecting the centers of the two circles and including the point on that line which is in the middle of the gap between the two circles. The resulting line equation is then used in lieu of the line connecting the two points of intersection for that pair of non contacting circles.

It is also worth noting that the degree of overlap (or the size of the gap between non contacting circles provides an indication of the differences in height above the tip of the magnet of the two overlapping (or non contacting) circles. By characterizing the variation of the magnetic field strength with vertical height for each of these probes the vertical location of the tip of the magnet may also be derived.

Otherwise, as noted previously for the two dimensional determination, the intersection 150 determines the location of the magnetic axis 26a. Step 320 then sets the location of the magnetic axis 26a, and therefore the device or magnet 26 producing the magnetic field, equal to the intersection 150 of the circles 135, 140, and 145. Of course, the vertical location of the magnet 26 may also be used to set the location of the tip of the magnet in step 320.

Additionally, the method may include a step to characterize the magnetic field strength and lateral distance before step 301, as discussed previously. That is, the strength of the magnetic field is measured with the probes and an equation is derived that relates subsequent measured field strengths to the lateral distance. The resulting equation forms the basis for the distance which partly defines each of the circles. Also, by so characterizing the probes and magnetic field, accuracy may be greatly improved. Thus, the present invention provides a more precise determination of the location of the magnetic axis than previous methods which rely on detecting the peak magnetic strength alone.

With reference to FIG. 10, a second embodiment of a magnetic indexer 400 is illustrated. The magnetic indexer 400 includes a single probe 402 which is affixed to an arm 404 of a robot 406. It will be understood that a plurality of probes can also be used with the robot 406. Only one probe 402, however, is necessary if placed next to the surface 408 in one location and then moved to another location along the surface 408 with an exact knowledge of the first location. Therefore, an effective plurality of probes is simulated by simply placing and moving the single probe 402 and exactly recalling the previous placements, and the field measurements, for each of the previous placements.

Additionally, probe 402 may sense the strength of the magnetic field as it moves between the first and the second locations. The field strength data thus accumulated may be analyzed to determine where along the path between the first and the second locations the rate of change of the magnetic field reaches a maximum (i.e. dB/dr). The location within the area of the maximum rate of change 170 (FIG. 9) and the sensed field strength at that location 170 may be used to calculate another distance to the central magnetic axis 26a. A magnet 410, which produces a magnetic field having a central magnetic axis 410a, is placed near the surface 408 opposite the magnetic indexer 400. A processor 414 determines the response of the probe 402 and controls the robot 406. In this way, the robot 406 can quickly locate the magnetic axis 410a, of the magnet 410, affixed to the support sheet 412. It will be understood, however, that separate processors may be used to determine the location of the magnetic axis 410a and control the robot 406. In addition, once the processor 414 has determined the exact location of the magnetic axis 410a, a tool may be placed on the robot arm 404 to produce the hole required. It will also be understood that a plurality of arms may extend from the robot 406 so that once the position of the magnetic axis 410a is located, a tool arm simply rotates in place with a tool extending from the tool arm to produce the hole in the surface 408. When a robot 406 is used, producing a hole serves to confirm that the magnet 410 has been properly located.

It will be understood that each embodiment of the present invention does not require a Hall-Effect probe. Any probe which is sensitive to or which can detect the magnetic field produced by the magnet 26, 410 may be used in the present invention. One alternative probe is a Three-Axis Magnetic Sensor Hybrid HMC2003 produced by Solid State Electronics Center, a division of Honeywell. The other portions of the magnetic indexer 10 are reproduced while simply replacing the Hall-Effect probe 18 with the alternative probe. If the alternative probe, such as the HMC2003, is able to determine a magnetic axis in more than one relative axis, then only one probe may be necessary on the magnetic indexer 10. It is still understood, however, that the single alternative probe still defines a central probe axis for determining the magnetic axis 26a, 410a. The alternative probe is still able to detect the field produced by the magnet 26, 410 and is able to indicate the magnetic axis 26a, 410a.

It will also be understood that the magnet used in the present invention must have its magnetic axis 26a, 410a properly and precisely aligned. Therefore, it may be desirable to first test the magnet 26, 410 using the magnetic indexer 10 to ensure that the magnetic axis 26a, 410a is properly aligned so that when the magnet 26, 410 is affixed to the beam 38 or the support sheet 412, the magnetic axis 26a, 410a is substantially perpendicular to the surface of the work piece 36, 408. This is because only when the magnetic axis 26a, 410a is produced substantially perpendicular to the surface is the strength of the field weakened sequentially as one moves away from the magnetic axis 26a, 410a. It is the magnetic field acting upon the probes which is sensed by the probes 18, 20, 22, and 412, which are used to determine where the magnets 26, 410 are positioned. If the magnetic axis 26a, 410a is angled to the surface (i.e., not perpendicular), the magnetic field would also not be perpendicular and the precise location of the magnetic axis 26a, 410a could not be correctly determined.

In addition, the magnetic indexer itself can be calibrated or zeroed. This means that the central axis of the magnetic indexer can be precisely determined before performing any tasks with the indexer. Generally, a magnetic source having a known magnetic axis can be placed at a zeroed position relative to the magnetic indexer, so that the magnetic indexer can be zeroed to that magnetic axis. After this, the precise zeroed position of the magnetic indexer is known and even greater preciseness can be attained with the magnetic indexer to locate a magnetic axis.

The preferred embodiments of the present invention thus provide a means to quickly and precisely detect the locations where holes need to be drilled in a work piece based on previously made hole location determinations that are otherwise not visible to an operator or optical detection machine. The preferred embodiments also allow for the precise detection of any non-visible landmark as well. That is, the present invention may be used to determine edges of hidden pieces as well. The present invention is especially well suited for aircraft manufacturing applications, but it will be appreciated that the invention will find utility in a wide variety of other manufacturing applications as well.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of locating a device, wherein the device produces a field and is disposed adjacent a second side of a structure, from a first side of the structure, and where the device cannot be visualized from the first side of the structure, the method comprising:

sensing the field strength produced by said device at a first location on the first side of the structure;

using the field sensed at the first location to determine a first distance from the center of said device to the first location; and sensing the field strength produced by said device at a second location on the first side of the structure; and using the field sensed at said second location to determine a second distance from the center of said device to said second location; and using said sensed field strengths and said first and second distance from said first and second locations to determine a location on said first side of said structure representing a center of said field being produced by said device, and therefore a center of said device.

2. The method of claim 1, further comprising:

sensing the field at a third location;

determining a third distance from the third location to the center of the field; and using the third distance in addition to the first and second distances to determine the location of the center of the field.

3. The method of claim 1 wherein the sensing of the field strength at said first location is accomplished with a first probe and the sensing of the strength field at a second location is accomplished using a second probe.

4. The method of claim 1, wherein the first location is at a location where a rate of change of the strength of the field is at a maximum.

5. The method of claim 1, wherein the field is a magnetic field.

6. The method of claim 1, further comprising: moving a tool to the determined location of the center of the field.

7. The method of claim 1 further comprising:

using said field strengths at said first and second locations to determine a location relative to said first side of said structure representing a tip of said device.

8. An apparatus for determining a location of a center of a field generated by a device, wherein the device is disposed adjacent a second side of a structure, from a first side of the structure such that a location of the device is not visually perceptible, the apparatus comprising:

an input for accepting a first signal representative of a strength of the field at a first location on the first side of the structure, and for accepting a second signal representative of the strength of the field at a second location on the first side of the structure;

a processor responsive to the first and second signals for extrapolating a location of a center of the field being generated by the device from the first and second signals and the first and second locations;

wherein the processor is further adapted to:

determine a first distance to the center of the field using the first signal, determine a second distance to the center of the field using the second signal, and determine a location of the center of the field using the first and second distances.

9. The apparatus of claim 8, further comprising:

a first and a second input being included in the at least one input whereby the processor is further adapted to accept the first signal from the first input and the second signal from the second input.

10. The apparatus of claim 9, further comprising a third input, being included in the input at least one input whereby the processor is further adapted for accepting a third signal representative of the field strength at a third location on the first side of the structure from the third input and to determine a third distance to the center of the field using the third field strength.

11. The apparatus of claim 9, whereby the processor is further adapted to accept characterization data for a field strength probe to be connected to the first input.

12. The apparatus of claim 8, whereby the processor is further adapted to determine a rate of change of the first signal.

13. The apparatus of claim 8, wherein the processor is further adapted to sense a magnetic field strength from the at least one input.

14. The apparatus of claim 8, wherein the processor is adapted to be connected to a tool positioning device.

15. The apparatus of claim 8, further comprising a field strength probe connected to the input.

16. The apparatus of claim 8, further comprising the processor extrapolating a location of a tip of the device from the first and second signals and the first and second locations.

17. A machine readable medium for use in locating a device wherein the device produces a field and is disposed adjacent a second side of a structure, from a first side of the structure, and where the device cannot be visualized from the first side of the structure, the machine readable medium including a sequence of instructions executable by a machine that causes the machine to operate to:

sense the field strength produced by the device at a first location on the first side of the structure;

sense a second the field strength produced by the device at a second location on the first side of the structure;

determine a first distance from the first location to the center of the field using the first field strength;

determine a second distance from the second location to the center of the field using the second field strength;

use said sensed field strengths and said first and second distance from the first and second to determine a location on the first side of the structure representing a center of the field being produced by the device.

18. The machine readable medium of claim 17, further including instructions executable by a machine that causes the machine to operate to: move a tool to the determined location of the center of the field.

19. The machine readable medium of claim 17, wherein the first location is at a location where a rate of change of the strength of the field is at a maximum.

20. The machine readable medium of claim 17, further including instructions executable by a machine that causes the machine to operate to: determine a location of a tip of said device from the first and second signals and the first and second locations.

* * * * *